United States Patent [19]
Hedden et al.

[11] Patent Number: 5,395,554
[45] Date of Patent: Mar. 7, 1995

[54] FLUX FOR PHOSPHOR PARTICLE SIZE CONTROL

[75] Inventors: David B. Hedden, Park Ridge, Ill.; William J. Zegarski, Towanda, Pa.

[73] Assignee: E. I. du Pont de Nemours and Company, Wilmington, Del.

[21] Appl. No.: 192,907

[22] Filed: Feb. 7, 1994

Related U.S. Application Data

[60] Continuation-in-part of Ser. No. 130,772, Oct. 4, 1993, abandoned, which is a division of Ser. No. 992,812, Dec. 16, 1992, Pat. No. 5,310,505.

[51] Int. Cl.$^6$ ............................................. C09K 11/78
[52] U.S. Cl. ............................................. 252/301.4 R
[58] Field of Search ................................ 252/301.4 R

[56] References Cited

U.S. PATENT DOCUMENTS

| | | | |
|---|---|---|---|
| 4,883,970 | 11/1989 | Page | 252/301.4 R |
| 4,929,386 | 5/1990 | Reddy | 252/301.4 R |
| 4,938,890 | 7/1990 | Reddy | 252/301.4 R |
| 5,064,729 | 11/1991 | Zegarski | 252/301.4 R |
| 5,132,192 | 7/1992 | Sieber et al. | 252/301.4 R |
| 5,141,673 | 8/1992 | Zegarski | 252/301.4 R |

FOREIGN PATENT DOCUMENTS

| | | | |
|---|---|---|---|
| 0491116A1 | 6/1992 | European Pat. Off. | C09K 11/78 |
| 0491309A1 | 6/1992 | European Pat. Off. | C09K 11/78 |
| 9316146 | 8/1993 | WIPO | C09K 11/78 |

OTHER PUBLICATIONS

Bergman et al, Ternary system of lithium and sodium metaborates and sulfates, *Chem. Abstructs*, vol. 71, 16463e, 1969 no month.

Che et al, Phase diagrams of pseudobinary systems lithium sulfate-lithium borate, *Chem. Abstructs*, vol. 95, 226562h, 1981 mo month.

*Primary Examiner*—Jack Cooper

[57] ABSTRACT

An improved flux for use in preparing X-ray phosphors comprises an alkali metal sulfate, an alkali metal metaborate and, a strontium halide. By varying the concentration of the metaborate and strontium halide in the flux composition, the size and dry bulk density of the phosphor particles and the speed of the phosphor, respectively, can be controlled. Also disclosed is a process of making phosphors using the above flux, and X-ray intensifying screens containing such phosphors.

4 Claims, No Drawings

FLUX FOR PHOSPHOR PARTICLE SIZE CONTROL

RELATED APPLICATIONS

The present patent application is a continuation-in-part of U.S. Ser. No. 08/130,772, filed Oct. 4, 1993, now abandoned, which is a divisional application of U.S. Ser. No. 07/992,812, filed Dec. 16, 1992, now U.S. Pat. No. 5,310,505.

FIELD OF INVENTION

This invention relates to luminescent phosphor materials and particularly to luminescent materials useful in the preparation of X-ray intensifying screens. More particularly, this invention relates an improved flux which allows for control of phosphor particle size.

BACKGROUND OF THE INVENTION

X-ray intensifying screens are generally used in conjunction with silver halide photographic films and serve to enhance the image formed on that film. Phosphors, which are the active component of X-ray screens, are legion in number and include the tungstates, the oxysulfides and oxybromides among others.

Particularly efficient phosphors which may be used in an X-ray intensifying screen are the tantalates disclosed in U.S. Pat. No. 4,225,623. These phosphors are based on yttrium, lutetium and gadolinium tantalates of the M' monoclinic form, which may be activated with niobium or other rare earths, such as terbium and thulium, for example, as more fully described therein. Such phosphors are prepared by mixing the phosphor precursor materials and firing the mixture to form the phosphor crystal lattice itself. During the firing step, it is often beneficial to use a flux which usually forms a partial liquid at the elevated firing temperatures. Thus, the flux can be thought of as a fluid in which the various component parts of the phosphor precursor react to form the crystalline phosphor.

The average particle size of the phosphor effects the characteristics of the phosphor and, hence, the radiographic images. Generally speaking, it is desirable to use phosphor with a small average particle size in radiographic applications which they require highest possible resolution (e.g., mammography) and a large average particle size phosphor for procedures in which patient exposure must be minimized (e.g., serial angiography). In general, larger phosphor particles absorb more X-rays and emit higher quantities of long wavelength radiation than smaller particles under the same radiation. Thus, larger particles are faster, resulting in less patient exposure.

Theoretically, larger particles should give lower levels of quantum mottle or improved signal-to-noise ratio than smaller particles due to less light spread in the phosphor layer of the intensifying screen. These benefits are generally not observed, however, because the improvement in mottle is masked by increased phosphor X-ray-to-light conversion which requires less X-ray stimulation and thus lower signal levels. It is expected that improvements in signal-to-noise performance would be obtained (thus improving the diagnostic quality of radiographs) if large particles were produced with X-ray-to-light conversion equal to that of smaller particles.

Also, larger particles pack less efficiently than smaller particles when coated in an intensifying screen. To obtain equal phosphor coating weights, larger particles must be coated as a thicker layer than smaller particles. Packing efficiency is also related to dry bulk density of the phosphor, with higher dry bulk density resulting in thinner phosphor layers. As known in the art, thicker phosphor layers lead to increased image spread which is deleterious to resolution.

There has been a long felt need in the art to provide the practitioner with a means of systematically controlling particle size and bulk density in the phosphor make process.

SUMMARY OF THE INVENTION

In one aspect, the present invention provides a flux composition for use in the manufacture of phosphor particles, comprising:
 a) 1–98% by weight of at least one alkali metal sulfate;
 b) 1–98% by weight of at least one alkali metal metaborate; and
 c) 1–50% by weight of at least one strontium halide.

DETAILED DESCRIPTION OF THE INVENTION

The flux composition of the present invention comprises at least one alkali metal sulfate and at least one alkali metal metaborate and at lest one strontium halide. Sodium sulfate and sodium metaborate are particularly preferred.

The relative amounts of the three flux ingredients is preferably 1–98% by weight alkali metal sulfate, 1–98% by weight alkali metal metaborate and 1–50% by a weight strontium halide. More preferred is 49–98% by weight alkali metal sulfate, 1–50% by weight alkali metal metaborate and 1–20% by weight strontium halide. Most preferred is 89–98% by weight alkali metal sulfate, 1–10% by weight alkali metal metaborate and 1–10% by weight strontium halide.

As demonstrated in the Examples herein, it has been discovered that the average size of the phosphor particles and the dry bulk density thereof increases proportionally with the amount of metaborate present in the flux composition. Thus, by simply adjusting the amount of metaborate present in the flux, one can control the size and dry bulk density of the phosphor. Accordingly, the flux composition will depend upon the particular intended use of the phosphor and the particle size and dry bulk density suitable for such use.

The presence of at least one strontium halide in the flux mixture has been shown to provide an improvement in the speed of the phosphor. The preferred strontium halide is strontium chloride.

According to the present invention in the first step of the process of phosphor make, stoichiometric amounts of the various phosphor precursor oxides are blended to form an intimate mixture. This blending may be accomplished in any number of ways known to those skilled in the art, such as, for example, by ball-milling or simply shaking the oxides together in a manner which will thoroughly blend them together. The use of a liquid medium, such as water, fluorochlorinated hydrocarbons or other such inert fluids, to improve the efficiency of the mixing process may also be incorporated.

The flux of the present invention is then incorporated into this intimate mixture and the flux-containing mixture is fired to produce the phosphor particles. The mixture will be fired for at least about three hours at elevated temperatures, e.g., from 1100° C. to 1400° C. A preferred temperature range is from 1250° C. to 1300° C. After firing, the phosphor is washed to remove excess flux and soluble reaction products. The phosphor is then recovered and used for the preparation of an X-ray intensifying screen.

While the applicability of this flux is not limited to the manufacture of any specific phosphor, the flux composition of the present invention is particularly advantageous for use in the production of the M' monoclinic tantalate phosphors described in U.S. Pat. No. 4,225,623, the disclosure of which is incorporated herein by reference.

After the phosphor is made according to the teachings of this invention, it can be used in the manufacture of X-ray intensifying screens as is known to those skilled in the art. The phosphor may be dispersed in any of the commonly known binders (e.g., polyvinyl butyral or the acrylates or methacrylates) using a solvent (e.g., an alcohol, chlorinated hydrocarbon, ketone, butyl acetate, etc.). Small amounts of fumed silica may be added in the phosphor to enhance handling and make the phosphor easier to pour. The phosphor-binder dispersion is then cast on a conventional support, such as cardboard, polyester film, thin metal sheets, etc. A brightener may also be present within the phosphor and various reflective materials, such as titanium dioxide, may be present as an underlayer or within the support itself to enhance the generation of light when the phosphor is struck by X-radiation. A dimensionally stable, polyethylene terephthalate film support into which small amounts of rutile or anatase titanium dioxide have been incorporated is the preferred support for the X-ray intensifying screen of this invention.

To protect the phosphor-binder layer from damage, a conventional protective topcoat may be applied and, in fact, is preferred. These topcoats are also well-known in the prior art and serve to protect the rather expensive phosphor layer from stains and defects during the handling thereof.

All of these procedures are well-known in the art. Conventional supports, binders, mixing and coating processes for the manufacture of typical X-ray intensifying screens are, for example, described in U.S. Pat. No. 4,387,141, the pertinent disclosure of which is incorporated herein by reference as well as the aforementioned U.S. Pat. No. 4,226,653.

For most applications in conventional radiology, the X-ray intensifying screens will be used in pairs in cooperation with double-side coated medical X-ray silver halide photographic film elements, although it is sometimes common to use single-side coated silver halide photographic film elements for some applications. The coating weights of each screen in the pair may be the same or different, as required and an asymmetric pair of screens may, in fact, provide the best results. Medical X-ray evaluations represent the predominant commercial use for X-ray intensifying screens of this invention.

Medical X-ray silver halide films are well known in the art and are commercially available. Conventional films typically comprise a support with at least one silver halide emulsion coated thereon. The silver halide grains are chemically and spectrally sensitized, as known in the art, such that they are most sensitive to the emission of the intensifying screen for which they are intended to be used. Many films are commercially available which will suffice for demonstration of the teachings herein.

EXAMPLES

This invention will now be illustrated by the following specific examples wherein the percentages and parts are by weight.

EXAMPLE 1

A 6 Kg mixture of yttrium oxide, tantalum oxide and thulium oxide in the molar ratio of 0.998:1.000:0.002 was milled to mix and deagglomorate the solids. The mixture of solid oxides were separated into six aliquots, each of which was then mixed with one of the flux compositions listed in Table 1. The oxide/flux mixtures were fired at 1290° C. for 12 hours and washed with deionized water. Average particle size (APS) and dry bulk density (DBD) were measured by a Fisher Sub-Sieve Sizer as well known in the art. Mixing with silicon dioxide resulted in a free flowing powder. The flux composition and properties are included in Table 1.

TABLE 1

PHOSPHOR FLUX MIXTURES AND RESULTING CHARACTERISTICS OF M' YTaO$_4$: Tm

| Example | Flux Composition[a] | | | APS[b] | DBD[c] | Comments |
|---|---|---|---|---|---|---|
| | Na$_2$SO$_4$ | SrCl$_2$ | Na$_2$B$_2$O$_4$ | | | |
| 1A | 500 | 0 | 0 | 3.6 | 1.24 | Control |
| 1B | 450 | 50 | 0 | 3.7 | 1.36 | Control |
| 1C | 450 | 45 | 5 | 4.8 | 1.63 | Inventive |
| 1D | 450 | 25 | 25 | 6.7 | 2.14 | Inventive |
| 1E | 450 | 5 | 45 | 8.0 | 2.49 | Inventive |
| 1F | 450 | 0 | 50 | 7.9 | 2.68 | Control |

[a] Expressed in grams per Kg of oxide mixture
[b] Expressed in μm
[c] Expressed in gm/mL

EXAMPLE 2

A 6 Kg mixture of yttrium oxide, tantalum oxide and terbium oxide in the molar ratio of 0.998:1.000:0.002 was milled to mix and deagglomorate the solids. The mixture of solid oxides were separated into aliquots and mixed with the flux compositions listed in Table 2. The oxide/flux mixtures were fired at 1290° C. for 12 hours. Washing with deionized water removed the flux from the phosphor particles. The average particle size (APS) and dry bulk density (DBD) were measured as described above. Mixing with silicon dioxide resulted in a free flowing powder. The flux composition and properties are included in Table 2.

TABLE 2

PHOSPHOR FLUX MIXTURES AND RESULTING CHARACTERISTICS OF M' YTaO$_4$:Tb

| Example | Flux Composition | | | APS | DBD | Comments |
|---|---|---|---|---|---|---|
| | Na$_2$SO$_4$ | SrCl$_2$ | Na$_2$B$_2$O$_4$ | | | |
| 2A | 500 | 0 | 0 | 3.2 | 1.06 | Control |
| 2B | 450 | 50 | 0 | 3.9 | 1.51 | Control |
| 2C | 450 | 45 | 5 | 6.8 | 1.84 | Inventive |
| 2D | 450 | 25 | 25 | 7.6 | 2.23 | Inventive |
| 2E | 450 | 5 | 45 | 12.6 | 2.89 | Inventive |
| 2F | 450 | 0 | 50 | 12.6 | 3.01 | Control |

Examples 1 and 2 illustrate that particle size and dry bulk density increases in proportion to the increase of Na$_2$B$_2$O$_4$ content in the flux.

EXAMPLE 3

Five 666 gm mixtures of yttrium oxide and tantalum oxide in the molar ratio of 1:1 were prepared. The mixtures were milled in freon/methanol to deagglomorate and mix the materials. The dry, milled mixtures were blended with the flux mixtures listed in Table 3 below. The mixtures were fired at 1290° C. for 12 hours, washed with deionized water, and the white solids were treated with silicon dioxide to give a free flowing powder. Particle size and dry bulk density were measured as above. The results are listed in Table 3.

TABLE 3

PHOSPHOR FLUX MIXTURES AND RESULTING CHARACTERISTICS OF M' YTaO$_4$

| Example | Flux Composition | | | APS | DBD | Comments |
|---|---|---|---|---|---|---|
| | Na$_2$SO$_4$ | SrCl$_2$ | Na$_2$B$_2$O$_4$ | | | |
| 3A | 500 | 0 | 0 | 5.0 | 1.66 | Control |
| 3B | 475 | 25 | 0 | 5.5 | 1.28 | Control |
| 3C | 475 | 20 | 5 | 7.2 | 1.64 | Inventive |
| 3D | 475 | 12.5 | 12.5 | 9.0 | 2.09 | Inventive |
| 3E | 475 | 5 | 20 | 12.5 | 2.19 | Inventive |

EXAMPLE 4

A 12 Kg mixture of tantalum oxide, yttrium oxide and niobium oxide in the molar ratios of 0.995:1.00:0.005 was prepared by milling in freon/methanol to deagglomorate and mix the powders. 1.1 Kg aliquots were removed and dry blended with the flux mixtures listed in Table 4. The mixtures were fired, washed with deionized water and treated with silicon dioxide to give a free flowing powder.

TABLE 4

PHOSPHOR FLUX MIXTURES AND RESULTING CHARACTERISTICS OF M' YTaO$_4$:Nb

| Example | Flux Composition | | | APS | DBD | Comments |
|---|---|---|---|---|---|---|
| | Na$_2$SO$_4$ | SrCl$_2$ | Na$_2$B$_2$O$_4$ | | | |
| 4A | 500 | 0 | 0 | 5.30 | 1.32 | Control |
| 4B | 475 | 25 | 0 | 2.80 | 1.29 | Control |
| 4C | 475 | 20 | 5 | 4.60 | 1.28 | Inventive |
| 4D | 475 | 5 | 20 | 7.60 | 2.43 | Inventive |
| 4E | 475 | 0 | 25 | 9.40 | 2.89 | Control |
| 4F | 450 | 50 | 0 | 4.00 | 1.41 | Control |
| 4G | 450 | 45 | 5 | 4.40 | 1.33 | Inventive |
| 4H | 450 | 25 | 25 | 4.60 | 1.94 | Inventive |
| 4I | 450 | 5 | 45 | 8.00 | 2.82 | Inventive |
| 4J | 450 | 0 | 50 | 9.20 | 2.88 | Control |

EXAMPLE 5

Example 4 was repeated using an 11 Kg oxide mixture and the flux mixtures listed below.

TABLE 5

PHOSPHOR FLUX MIXTURES AND RESULTING CHARACTERISTICS OF M' YTaO$_4$:Nb

| Example | Flux Composition | | | APS | DBD | Comment |
|---|---|---|---|---|---|---|
| | Li$_2$SO$_4$ | SrCl$_2$ | Li$_2$B$_2$O$_4$ | | | |
| 5A | 500 | 0 | 0 | 8.3 | 1.99 | Control |
| 5B | 475 | 25 | 0 | 9.1 | 1.89 | Control |
| 5C | 475 | 20 | 5 | 13.0 | 1.75 | Inventive |
| 5D | 475 | 5 | 20 | 20.5 | 3.54 | Inventive |
| 5E | 475 | 0 | 25 | 27.8 | 3.60 | Control |
| 5F | 450 | 50 | 0 | 7.4 | 1.64 | Control |
| 5G | 450 | 45 | 5 | 12.0 | 3.57 | Inventive |
| 5H | 450 | 25 | 25 | 15.0 | 3.51 | Inventive |
| 5I | 450 | 5 | 45 | 25.7 | 3.26 | Inventive |
| 5J | 450 | 0 | 50 | 39.1 | 3.10 | Control |

EXAMPLE 6

An 11 Kg mixture of tantalum oxide, yttrium oxide and niobium oxide was prepared in a molar ratio of 0.995:1.0:0.005. The mixture was milled to deagglomorate and mix the materials. 1.1 Kg aliquots of the mixture were removed and were dry blended with the flux mixtures listed below. The mixtures were fired, washed and treated with silicon dioxide to obtain a free flowing powder. Physical properties of the resulting materials are included in Table 6.

TABLE 6

PHOSPHOR FLUX MIXTURES AND RESULTING CHARACTERISTICS OF M' YTaO$_4$:Nb

| Example | Flux Composition | | | APS | DBD | Comments |
|---|---|---|---|---|---|---|
| | Na$_2$SO$_4$ | SrCl$_2$ | Na$_2$B$_2$O$_4$ | | | |
| 6A | 500 | 0 | 0 | 3.5 | 1.4 | Control |
| 6B | 475 | 25 | 0 | 3.5 | 1.0 | Control |
| 6C | 475 | 20 | 5 | 4.2 | 1.5 | Inventive |
| 6D | 475 | 5 | 20 | 6.2 | 2.1 | Inventive |
| 6E | 475 | 0 | 25 | 6.2 | 2.2 | Control |
| 6F | 450 | 50 | 0 | 3.3 | 1.3 | Control |
| 6G | 450 | 45 | 5 | 4.8 | 1.5 | Inventive |
| 6H | 450 | 25 | 25 | 6.2 | 2.1 | Inventive |
| 6I | 450 | 5 | 45 | 8.7 | 2.6 | Inventive |
| 6J | 450 | 0 | 50 | 9.5 | 2.7 | Control |

EXAMPLE 7

Phosphors from Example 6 were ball-milled with a polymer binder and the phosphor-binder mixture was coated into a titanium dioxide filled Mylar ® sheet to form an X-ray intensifying screen. The emission intensity under X-ray excitation was determined by exposing a Cronex ®7 medical X-ray film (E. I. du Pont de Nemours and Company, Wilmington, DE). Determination of the photographic speed of the film/screen combination was used as an estimate of the emission of the screen. All speeds were determined relative to a CaWO$_4$-containing intensifying screen as a control which was arbitrarily set to a relative speed of 1.00 for comparison purposes. Resolution was evaluated visually relative to phosphor 6A, which was arbitrarily assigned a value of 1.00.

TABLE 7

INTENSIFYING SCREEN RESULTS

| Example | Phosphor | Coating Wt (mg/in$^2$) | Rel. Speed | Rel. Resolution | Comments |
|---|---|---|---|---|---|
| 7A | 6A | 350 | 1.82 | 1.00 | Control |
| 7B | 6B | 350 | 1.92 | 1.06 | Control |
| 7C | 6C | 350 | 2.16 | 1.04 | Inventive |
| 7D | 6D | 350 | 2.11 | 0.96 | Inventive |
| 7E | 6E | 350 | 1.91 | 0.97 | Control |
| 7F | 6F | 350 | 1.88 | 1.07 | Control |
| 7G | 6G | 350 | 2.03 | 1.05 | Inventive |
| 7H | 6H | 350 | 2.12 | 0.96 | Inventive |
| 7I | 6I | 350 | 2.08 | 0.96 | Inventive |
| 7J | 6J | 350 | 1.88 | 0.88 | Control |

The intensifying screen results of Table 7 illustrate that a phosphor made generates a phosphor with an easily controlled average particle size. For example, phosphor 6J is approximately three times the size of phosphor 6F. According to conventional wisdom, one would expect phosphor 6J to be of much higher speed than phosphor 6F because of its larger particle size, yet they have essentially the same speed. In addition, theses data show that phosphor made using a ternary flux comprising an alkali metal sulfate, an alkali metal metaborate, and a strontium halide in accordance with this invention have significantly increased speed without a loss in resolution, which is contrary to what would have been expected. Thus, the present invention offers the additional advantage of being able to produce higher speed phosphors and screens without the expected loss in image quality.

What we claim is:

1. A flux composition for use in the manufacture of phosphor particles, comprising:
   a) 1–98% by weight of at least one alkali metal sulfate;
   b) 1–98% by weight of at least one alkali metal metaborate; and
   c) 1–50% by weight of at least one strontium halide, the % by weight of a, b and c being based on the total weight alkali metal sulfate, alkali metal metaborate and strontium halide in the flux composition.

2. The flux composition of claim 1, comprising:
   a) 49–98% by weight of at least one alkali metal sulfate;
   b) 1–50% by weight of at least one alkali metal metaborate; and
   c) 1–20% by weight of at least one strontium halide.

3. The flux composition of claim 2, comprising:
   a) 89–98% by weight of at least one alkali metal sulfate;
   b) 1–10% by weight of at least one alkali metal metaborate; and
   c) 1–10% by weight of at least one strontium halide.

4. The flux composition of claim 1 wherein said at least one alkali metal sulfate is sodium sulfate; wherein said at least one alkali metal metaborate is sodium metaborate; and wherein said at least one strontium halide is strontium chloride.

* * * * *